(12) United States Patent
Hiratsuka et al.

(10) Patent No.: US 7,396,613 B2
(45) Date of Patent: Jul. 8, 2008

(54) BATTERY PACK AND METHOD FOR PRODUCING SAME

(75) Inventors: Masaru Hiratsuka, Kanagawa (JP); Mitsuo Sakamoto, Tokyo (JP); Takao Sawaguchi, Fukushima (JP); Kazuhito Hatta, Fukushima (JP)

(73) Assignee: Sony Corporation, Tokyo (JP)

( * ) Notice: Subject to any disclaimer, the term of this patent is extended or adjusted under 35 U.S.C. 154(b) by 49 days.

(21) Appl. No.: 11/557,817

(22) Filed: Nov. 8, 2006

(65) Prior Publication Data

US 2007/0111091 A1    May 17, 2007

Related U.S. Application Data

(62) Division of application No. 10/667,284, filed on Sep. 17, 2003, now Pat. No. 7,166,389.

(30) Foreign Application Priority Data

Sep. 27, 2002   (JP)   ............................ P2002-284179

(51) Int. Cl.
   *H01M 2/02*   (2006.01)
   *H01M 2/08*   (2006.01)
(52) U.S. Cl. .................................... 429/176; 429/185
(58) Field of Classification Search ................ 429/176, 429/185
   See application file for complete search history.

(56) References Cited

U.S. PATENT DOCUMENTS 6,218,041 B1    4/2001   Barbier et al.

FOREIGN PATENT DOCUMENTS

| EP | 0 917 218 A2 | 5/1999 |
|----|---|---|
| EP | 0 996 178 A1 | 4/2000 |

*Primary Examiner*—Gregg Cantelmo
(74) *Attorney, Agent, or Firm*—Bell, Boyd & Lloyd LLP

(57) ABSTRACT

A battery pack is provided. The battery device is accommodated and hermetically sealed in a packaging unit and is packed along with a connection substrate and a frame by the packaging unit. A laminated material used for hermetically sealing the battery device is also used as an exterior material for the battery pack.

6 Claims, 11 Drawing Sheets

BATTERY PACK AND METHOD FOR PRODUCING SAME

CROSS REFERENCE TO RELATED APPLICATIONS

This patent application is a divisional of U.S. application Ser. No. 10/667,284 filed on Sep. 17, 2003, which issued as U.S. Pat. No. 7,166,389 on Jan. 23, 2007, and which claims priority to Japanese Patent Document No. P2002-284179 filed on Sep. 27, 2002, the disclosure of which is herein incorporated by reference.

BACKGROUND

The present invention relates to a battery pack. More specifically, the present invention relates to a battery pack in which the volume of an exterior portion thereof has been decreased to a smallest possible value.

Recently, a demand for information equipment, such as a notebook personal computer, mobile communication equipment, such as a portable telephone set, or a portable electronic equipment, such as a video camera, is increasing rapidly. As the power supply for these electronic equipment, hermetically sealed small-sized secondary batteries, such as a nickel-cadmium battery, a nickel-hydrogen battery or a lithium ion battery, are predominantly used. Of these, the lithium ion battery is used in a large variety of applications, by exploiting its characteristics, including high voltage, high energy density and light weight.

In particular, as measures for combating the problem of liquid leakage, presented in case of employing a liquid type electrolyte, a so-called polymer lithium ion secondary battery, employing a high molecular gel film, obtained on impregnating a polymeric material with a non-aqueous electrolytic solution, or employing an all-solid electrolyte, as an electrolyte, has been proposed.

In a battery of this type, a unit cell 101, comprised of a battery device of a laminated structure, is housed within upper and lower halves 103, 104 of a plastics casing, along with a connection substrate, including a protective circuit or terminals, to constitute a battery pack 100, as shown for example in FIG. 18 (Japanese Laying-Open Patent Publication 2002-8606).

With such structure, a thickness of 0.3 to 0.4 mm is needed for the plastics casing. If a double-face tape for mounting and/or the tolerance is taken into account, an increase in thickness on the order of 0.8 to 1 mm needs to be considered for the cell thickness. As regards the outer rim, a shape allowance to permit ultrasonic welding of upper and lower casing halves is needed, and hence a thickness on the order of 0.7 mm is required. The result is that the volume of battery pack is necessarily increased by a factor of 1.3 to 1.4.

SUMMARY

The present invention provides a battery pack in which volumetric increase for the pack is suppressed to the smallest possible value without detracting from mechanical strength or reliability of battery terminals, and a manufacturing method therefor.

In an embodiment, the present invention provides a battery pack including a battery device having a cathode, an anode and a polymer electrolyte, with a terminal being taken out from each of the cathode and the anode, a packaging unit having a first area, carrying a housing recess for accommodating the battery device therein, a second area formed in continuation to the first area, and a third area formed in continuation to the second area substantially at right angles to the first area, a frame mounted around the battery device, accommodated in the housing recess and covered up by and bonded to the second area, and a connection substrate mounted on the frame, and including a terminal unit connected to the terminals, the terminal unit being adapted to be electrically connected to an external apparatus.

The battery device is accommodated in the housing recess, the second area, lying opposite to the terminals of the accommodated battery device, is folded back against the first area to cover up a first surface of the battery device, exposed to outside, the first and second areas being then bonded to each other, the terminals of the battery device, accommodated in the housing recess, and covered up by and bonded to the second area, are connected to the connection substrate, the frame is mounted around the battery device and the connection substrate is mounted to the frame, the third area of the packaging unit is folded against the second area to cover up a second surface opposite to a first surface of the battery device, accommodated in the housing recess, covered up by and bonded to the first area. The third area and the first area are bonded to each other.

With the battery pack according to an embodiment of the present invention, the volumetric efficiency can be improved by employing the laminated material of the battery device simultaneously as an exterior packing material.

In another embodiment, the present invention provides a method for producing a battery pack comprising a first step of housing a battery device, having a cathode, an anode and a polymer electrolyte and including a terminal taken out from the cathode and a terminal taken out from the anode, in a housing recess of a packaging unit, adapted for accommodating the battery device therein, the packaging unit having a first area, carrying the housing recess, a second area formed in continuation to the first area, and a third area formed in continuation to the second area substantially at right angles to the first area, a second step of folding the second area, lying opposite to the terminals of the battery device, accommodated in the housing recess, against the first area, to cover up the first surface of the battery device, exposed to outside, to bond the first area and the second area to each other, a third step of connecting the terminals of the battery device, accommodated in the housing recess, and covered up by and bonded to the second area, to a connection substrate provided with a terminal unit adapted for being electrically connected to an external apparatus, mounting a frame around the battery device and mounting the connection substrate on the frame, a fourth step of folding the third area of the packaging unit against the second area to cover up a second surface opposite to the first surface of the battery device, accommodated in the housing recess, covered up by and bonded to the second area, with the third area, and a fifth step of bonding the third area to the first area.

With the manufacturing method for the battery pack according to an embodiment of the present invention, the volumetric efficiency may be improved by employing the laminated material of the battery device simultaneously as an exterior packing material.

In yet another embodiment, the present invention provides a battery pack including a battery device having a cathode, an anode and a polymer electrolyte, with a terminal being taken out from each of the cathode and the anode, a first packaging member having a housing recess for accommodating the battery device therein, and a connecting piece around the housing recess, a second packaging member having at least a first area for covering up a first surface, exposed to outside, of the battery device accommodated in the housing recess, and a second area for covering up a second surface of the battery device opposite to the first surface, a frame mounted around the battery device, accommodated in the housing recess and covered up by and bonded to the first area, and a connection substrate mounted on the frame, and including a terminal unit for electrical connection to an external apparatus, the terminal unit being connected to the terminals.

With the battery pack of the present invention, the battery device is accommodated in the housing recess of the first packaging member, a first surface of the battery device, exposed to outside, is covered up by the first area of the second packaging member, the connecting piece is bonded to the first area, the terminals of the battery device, accommodated in the housing recess, covered up by and bonded to the first area, are connected to the connection substrate, the frame is mounted around the battery device, the connection substrate is mounted on the frame, the second area of the second packaging member is folded against the first area thereof to cover up a second surface opposite to the first surface of the battery device accommodated in the housing recess of the first packaging member and covered up by the first area, with the second area, and the first packaging member is bonded to the second area of the second packaging member.

With the battery pack according to an embodiment of the present invention, the volumetric efficiency can be improved by employing the laminated material of the battery device simultaneously as an exterior packing material.

In a further embodiment, the present invention provides a method for producing a battery pack comprising a first step of housing a battery device, having a cathode, an anode and a polymer electrolyte and including a terminal taken out from the cathode and a terminal taken out from the anode, in a housing recess formed in a first packaging member for accommodating the battery device therein, the first packaging member including a connecting piece formed around the housing recess, a second step of covering up a first surface, exposed to outside, of the battery device accommodated in the housing recess, with a first area of a second packaging member, the second packaging member including at least the first area covering up the first surface and a second area covering up a second surface of the battery device opposite to the first surface, and bonding the connecting piece to the first area, a third step of connecting the terminals of the battery device, accommodated in the housing recess, covered up by and bonded to the first area, to a connection substrate, provided with a terminal unit adapted for being electrically connected to an external apparatus, mounting a frame around the battery device and mounting the connection substrate on the frame, a fourth step of folding the second area of the second packaging member against the first area to cover up the second surface opposite to the first surface of the battery device, accommodated in the housing recess of the first packaging member and covered up by the first area, with the second area, and a fifth step of bonding the first packaging member to the second area of the second packaging member.

With the battery pack 1, prepared as described above, in which the laminate material of the battery device 2 is also used as an exterior packing material, the volumetric efficiency may be improved by not less than 10% as compared to the case of using the plastics casing as an exterior material, thereby improving the volumetric density of the battery pack 1. With the manufacturing method for the battery pack according to an embodiment of the present invention, the volumetric efficiency can be improved by employing the laminated material of the battery device simultaneously as an exterior packing material.

By arranging the frame around the battery device 2, the mechanical strength and the reliability of battery terminals comparable to those in case of using the plastics casing may be maintained to assure high operational reliability.

By employing the laminate material of the battery device 2 common as the packaging unit, the designing may be simplified, while the battery device and the battery pack may be produced in an integrated process to diminish processing costs. moreover, with the production time being shorter to improve the production efficiency.

Additional features and advantages are described herein, and will be apparent from, the following Detailed Description and the figures.

DETAILED DESCRIPTION

Figure 1:
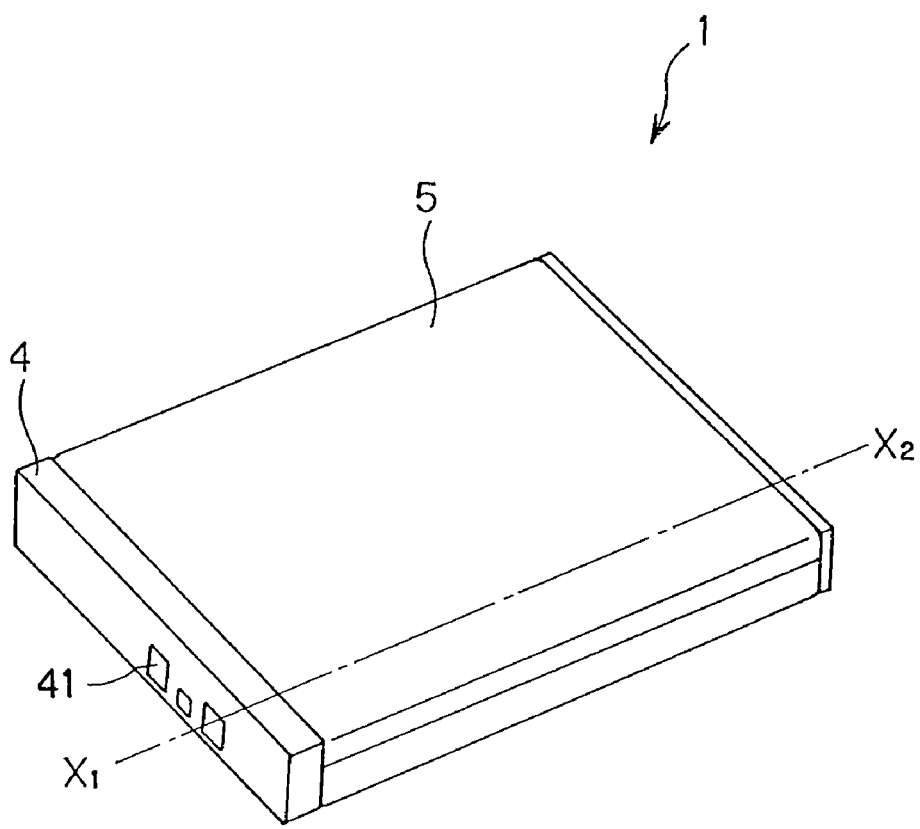
FIG. 1 is a perspective view showing an illustrative structure of a battery pack embodying the present invention.

The present invention relates to a battery pack. In particular, the present invention relates to a battery pack in which the volume of an exterior portion thereof has been decreased to a smallest possible volume. Referring to the drawings, preferred embodiments of a battery pack embodying the present invention will be explained in detail.

FIG. 1 is a perspective view showing an illustrative structure of a battery pack embodying the present invention. FIG.

2 depicts a cross-sectional view along line $X_1$-$X_2$ of FIG. 1. FIGS. 3 to 8 illustrate a manufacturing method for a battery pack.

The battery pack 1 is made up by a battery device 2, a connection substrate 3, a frame 4 and a packaging unit 5. The battery device 2 is housed and hermetically sealed in the packaging unit 5, and is packaged, together with the connection substrate 3 and the frame 4, by the packaging unit 5.

With the battery device 2, a band-shaped cathode and a band-shaped anode are stacked together, with a polymer electrolyte layer and/or a separator in-between, and are coiled along the longitudinal direction. A cathode terminal 21 and an anode terminal 22 are taken outwards from the cathode and the anode, respectively.

The cathode includes a layer of a cathode active material formed on a band-shaped cathode current collector and a polymer electrolyte layer formed on the layer of the cathode active material. The anode includes a layer of an anode active material formed on a band-shaped anode current collector and a polymer electrolyte layer formed on the layer of the anode active material. The cathode terminal 21 and the anode terminal 22 are bonded to the cathode active material and to the anode active material, respectively.

The cathode can be formed, for example, using a metal oxide, a metal sulfide or a specified high molecular material, as a cathode active material, depending on the sort of the targeted battery. For example, in producing a lithium ion battery, a lithium complex oxide, mainly composed of $Li_xMO_2$, can be used, where M is one or more transition metal(s) and x is usually not less than 0.05 and not more than 1.10, depending on the charging/discharging state of the battery. As the transition metals M, forming the lithium complex oxide, Co, Ni or Mn is preferred. Specified examples of the lithium complex oxides include $LiCoO_2$, $LiNiO_2$ and $LiNi_yCo_{1-y}O_2$, where $0<y<1$, and $LiMn_2O_4$. These lithium complex oxides are capable of yielding a high voltage to prove a cathode active material superior insofar as the energy density is concerned. As the cathode active material, metal sulfides or oxides, not containing lithium, such as $TiS_2$, $MoS_2$, $NbSe_2$, $V_2O_5$, and the like can also be used. For the cathode, plural species of these cathode active materials may be used in combination. In constructing a cathode, using the above-mentioned cathode active materials, it is possible to add known electrically conductive materials or binders.

As the anode material, those materials which are capable of doping/undoping lithium may be used. For example, carbonaceous materials, such as a non-graphitizable carbonaceous material or a graphitic material, may be used. More specifically, carbonaceous materials, such as pyrocarbons, cokes (pitch coke, needle coke or petroleum coke), graphites, vitreous carbons, sintered organic high molecular compounds (phenolic or furane resins sintered and carbonized at a suitable temperature), carbon fibers or activated charcoal, may be used. Other examples of the materials capable of doping/undoping lithium include high molecular materials, such as polyacetylene or polypyrrole, and oxides, such as $SnO_2$. Meanwhile, any suitable known binders may be added in forming an anode from these materials.

A polymer electrolyte can be obtained by mixing a high molecular material, an electrolytic solution and an electrolyte salt to form a gel and by introducing the so formed gel into a polymer. The high molecular material exhibits compatibility with the electrolytic solution, and can be, for example, a silicon gel, an acrylic gel, acrylonitrile gel, a polyphosphasen modified polymer, polyethylene oxide, polypropylene oxide, a complex polymer, a cross-linked polymer or a modified polymer thereof, or a fluorine-based polymer, such as poly (vinylidene fluoride), poly(vinylidene fluoride-co-tetrafluoropropylene) or poly(vinylidene fluoride-co-trifluoroethylene), or a mixture thereof.

The component of the electrolytic solution is such as is able to disperse the aforementioned high molecular material therein. As a non-protonic solvent, ethylene carbonate (EC), propylene carbonate (PC) or butylene carbonate (BC), for example, is used. An electrolyte salt used is such as is compatible with the solvent and is a combination of cations and anions. As the cations, alkali metals or alkali metal salts are used. As the anions, $Cl^-$, $Br^-$, $I^-$, $SCN^-$, $ClO_4^-$, $BF_4^-$, $PF_6^-$ or $CF_3SO_3^-$, for example, can be used. As the electrolytic salt, lithium phosphate hexafluoride, lithium borate tetrafluoride and the like can be used in a concentration that allows for dissolution thereof in the electrolytic solution.

Figure 3:
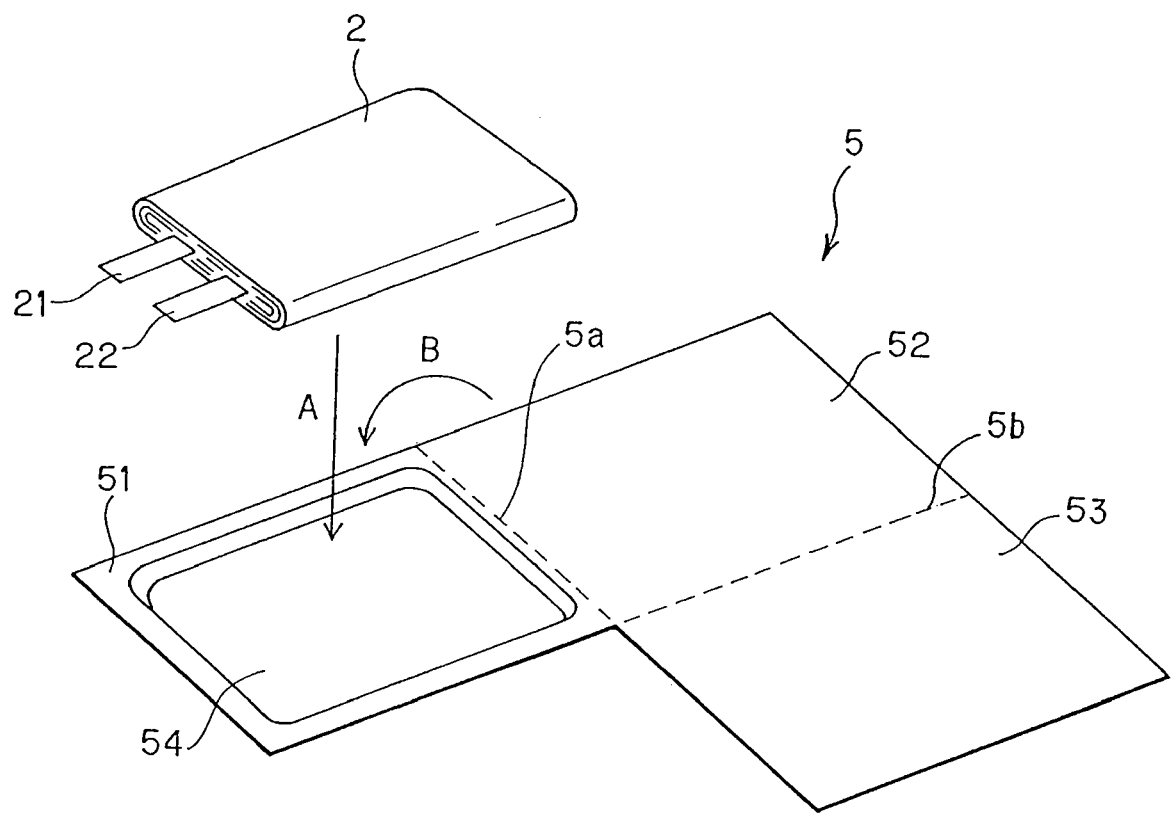
FIG. 3 is a perspective view showing the manner of housing a battery device in a housing recess.

In an embodiment, the packaging unit 5, adapted for housing the battery device 2 therein, is substantially L-shaped. Specifically, the packaging unit includes a substantially rectangular-shaped first area 51, a substantially rectangular second area 52, continuing to the first area 51 along the longitudinal direction thereof, and a substantially rectangular third area 53, continuing to the second area 52 along the direction of the short side of the second area 52, substantially at right angles to the first area 51, as shown in FIG. 3. In the first area 51 is pre-formed a housing recess 54 in which to accommodate the battery device 2.

Figure 4:
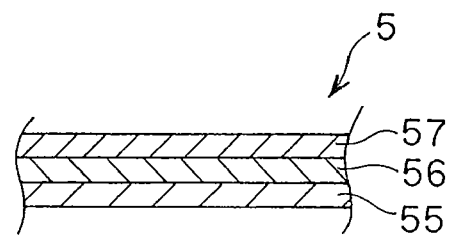
FIG. 4 is a cross-sectional view showing a laminated structure of a packaging unit.

The packaging unit 5 is of a laminated structure of a polypropylene (PP) layer 55, an aluminum layer 56, and a nylon layer 57, looking sequentially from the inner layer, as shown in FIG. 4. The aluminum layer 56 prevents the moisture from intruding into the inside area, while the polypropylene layer 55 prevents the polymer electrolyte from being transmuted and also acts as a junction surface for the packaging unit 5. That is, when bonding the packaging unit 5 to itself, the polypropylene layers 55 of neighboring turns facing each other are thermally fused together at approximately 170° C. The nylon layer 57 imparts a predetermined strength to the packaging unit 5.

It should be noted that the structure of the packaging unit 5 is not limited to the above structure, such that a large variety of materials and films of a layered structure may be used. The bonding method also is not limited to thermal fusion.

The materials that can be used to make up the packaging unit 5 include, for example, aluminum, polyethylene terephthalate (PET), non-axially stretched polypropylene, acid-modified polypropylene, ionomer and ON.

In an embodiment, the present invention uses the laminate material for hermetically sealing the battery device 2 and also as an exterior material for the battery pack 1, whereby the plastics casing may be dispensed with to improve the volumetric efficiency.

First, the battery device 2 is accommodated in the housing recess 54, formed in the first area 51 of the packaging unit 5, as indicated by arrow A in FIG. 3. At this time, the battery device 2 is placed so that its terminal side lies opposite to the second area 52.

The second area 52 then is folded back on the first area 51, along a folding line 5a, as shown by an arrow B. The first surface, exposed to outside, of the battery device 2, accommodated in the housing recess 54, is now covered up by the second area 52.

The first area 51 and the second area 52 are then bonded together. For this bonding, the polypropylene layer sides of the first and second areas 51, 52 are caused to face each other and thermally fused together at approximately 170° C.

Figure 8:
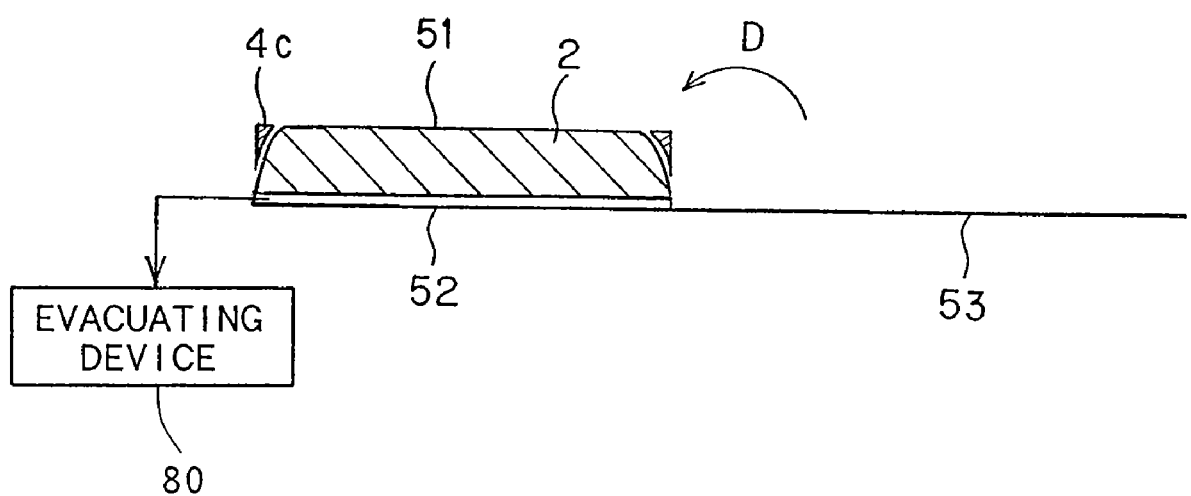
FIG. 8 is a cross-sectional view showing the state in which the frame is placed around the battery device housed in position.

At this time, the operation of evacuation is carried out simultaneously with the bonding operation, using an evacuating device 80, as shown in FIG. 8. By this force of suction, the battery device 2 is covered up and hermetically sealed by the first and second areas 51, 52. At this time, the cathode terminal 21 and the anode terminal 22 of the battery device 2 are drawn out of the packaging unit 5, as the terminals are held between the bonding surfaces of the first and second areas 51, 52.

At the time of evacuation, the first area 51 is subjected to a force of suction, as shown in FIG. 8. Thus, the battery device 2, accommodated in the housing recess 54, is drawn and assumes a profile of a substantially trapezoidal cross-sectional shape with a side of a smaller length or a second surface corresponding to the bottom surface of the housing recess 54 and with a side of a longer length or a second surface corresponding to the opened surface of the housing recess 54.

The cathode terminal 21 and the anode terminal 22 are then bonded to a terminal unit 31 of the connection substrate 3. This terminal unit 31 is electrically connected to an external apparatus. The connection substrate 3 is provided e.g. with a protective circuit chip 32.

Figure 5:
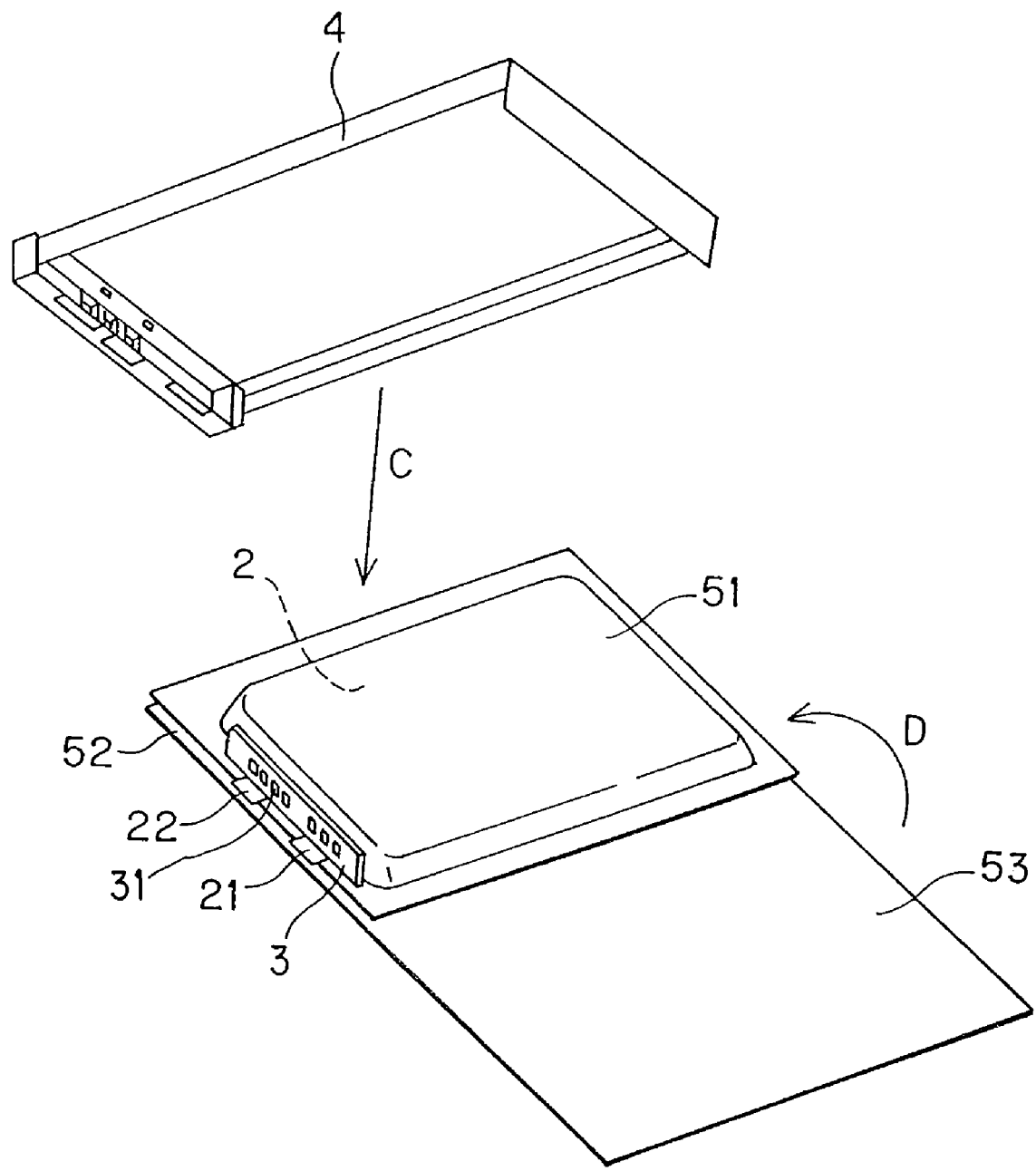
FIG. 5 is a perspective view showing the manner of placing a frame around the housed battery device.

Then, from the first area 51, the frame 4 is placed around the perimeter of the battery device 2, accommodated in the housing recess 54 of the first area 51 and covered up and hermetically sealed by the second area 52, as indicated by an arrow C in FIG. 5. The connection substrate 3, to the terminal unit 31 of which have been bonded the cathode terminal 21 and the anode terminal 22, is fitted to the frame 4.

Figure 6:
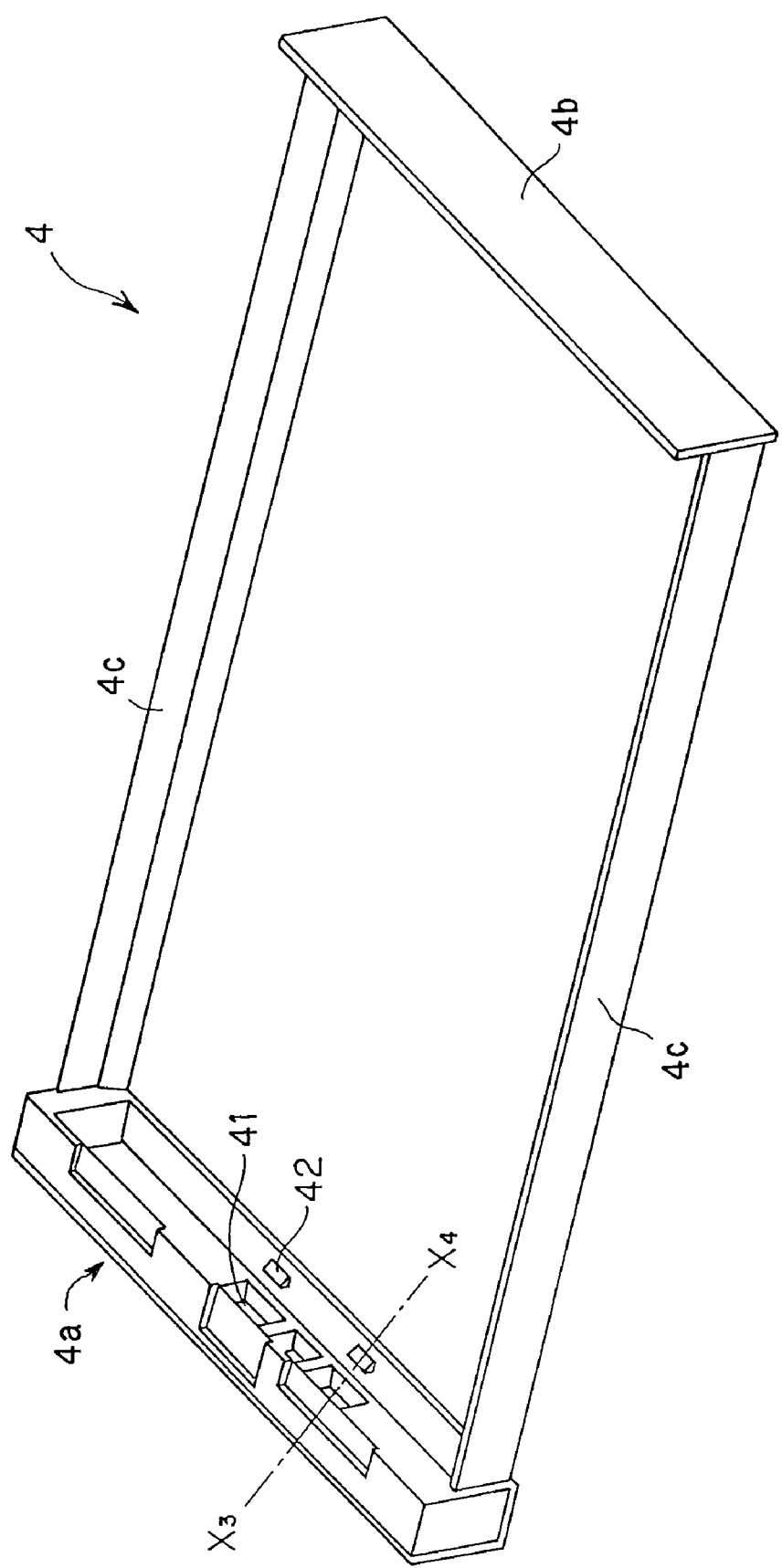
FIG. 6 is a perspective view showing the structure of a frame.

Referring to FIGS. 5 and 6, this frame 4 is a frame-shaped member of a size conforming to the outer shape of the battery device 2, and is made up by a front wall section 4a, mounted towards a terminal of the battery device 2, a rear wall section 4b, mounted on the side opposite to the terminal of the battery device 2, and a sidewall section 4c, mounted on the lateral surface side of the battery device 2. With the frame 4, mounted on the perimeter of the battery device 2, the battery device may be protected against the impact of e.g. descent. This frame 4 may be formed of a large variety of plastics materials. In particular, from the perspective of bonding the frame to the packaging unit 5, the frame is preferably formed of a material which is of the same material type as polypropylene constituting the junction surface of the packaging unit 5, that is, polypropylene or a material having a melting point equivalent to that of polypropylene.

The battery device 2 is substantially of the trapezoidal cross-section, as a result of the evacuation, as described above. A sidewall section 4c of the frame 4 is mounted in a gap formed along the rim of a second surface of the battery device 2, as shown in FIG. 8. This allows effective utilization of a dead space to make for a further increase in the volumetric efficiency.

Preferably, the portion of the sidewall section 4c facing the battery device 2 is of an R-shape. This further increases the strength and shock-proofness of the frame 4.

The connection substrate 3 is mounted on a front wall section 4a of the frame 4, facing the terminal of the battery device 2, while an opening 41 is formed in the front wall section 4a. The role of this opening 41 is to allow the terminal unit 31 of the connection substrate 3 to be exposed to outside, such that the connection substrate 3 is mounted to the frame 4 such as to expose the terminal unit 31 to outside via opening 41. The terminal unit 31, exposed to outside via opening 41, is electrically connected to an outside apparatus. In the present embodiment, three openings 41 are provided for use for a cathode terminal, an anode terminal and for a terminal for further information. This, however, is not intended for limiting the present invention.

This frame 4 is provided with a substantially triangular-shaped retention member 42. The connection substrate 3 is mounted on the frame 4 by being held by this retention member 42.

Figure 7:
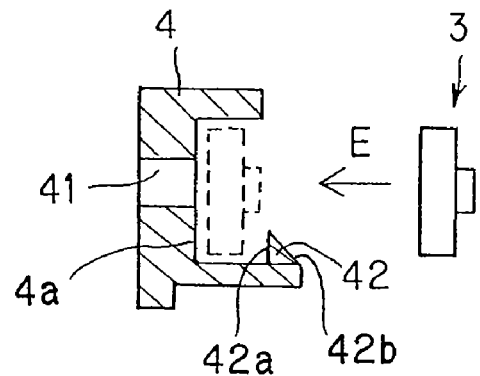
FIG. 7 is a cross-sectional view taken along line $X_3$-$X_4$ of FIG. 6.

FIG. 7 shows the retention member 42 to an enlarged scale. The retention member 42 has a shape of substantially right-angled triangle composed of a substantially upstanding surface 42a towards the front wall section 4a and an oblique surface 42b inclined towards an opening side. For mounting the connection substrate 3 in this frame 4, the connection substrate 3 is thrust along the direction of an arrow E in FIG. 7 so that the connection substrate 3 rides over the oblique surface 42b of the retention member 42. This places the connection substrate 3 between the front wall section 4a of the frame 4 and the upstanding surface 42a of the retention member 42. For dismounting the connection substrate 3, the connection substrate 3 must ride over the upstanding surface 42a of the retention member 42, so that it is possible to prevent e.g. accidental descent of the connection substrate 3.

If, in connecting a connection terminal from an outside apparatus to the terminal unit 31 of the connection substrate 3, the connection terminal is pushed into the inside of the frame via opening 41, such that a force is applied from outside to the connection substrate 3, the connection substrate may be prohibited against descent by the retention member 42, so that the state of the connection substrate held by the retention member 42 may be maintained to assure more reliable terminal connection.

By mounting the frame 4 around the battery device 2, it is possible to maintain the mechanical strength and reliability of the terminals comparable to that in case the battery device 2 is accommodated in a plastics casing, despite the fact that such plastics casing is not used.

The third area 53 is then folded back on the second area 52, along a fold line 5b, as indicated by an arrow D in FIGS. 5 and 8. The surface of the first area 51, accommodating the battery device 2, and which lies opposite to the surface bonded to the second area 52, that is the side of the first area 51 towards the second surface of the battery device 2, is now covered up by the third area 53.

Finally, the third area 53 is bonded to the first area 51. For this bonding, the third area 53 is placed facing the polypropylene layer side of the first area 51 and is thermally fused thereto at a temperature of approximately 170° C.

Figure 2:
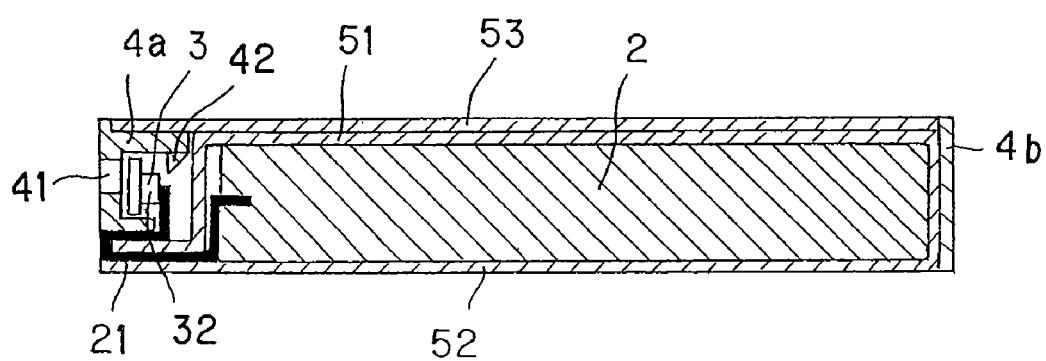
FIG. 2 is a cross-sectional view taken along line $X_1$-$X_2$ of FIG. 1.

In this manner, the battery device 2 is housed and hermetically sealed in the inside of the packaging unit 5, while the connection substrate 3 and the frame 4 are packaged by the packaging unit 5 to complete the battery pack 1 shown in FIGS. 1 and 2.

With the battery pack 1, prepared as described above, in which the laminate material of the battery device 2 is simultaneously used as an exterior packing material, the volumetric efficiency may be improved by not less than 10% as compared to the case of using the plastics casing as an exterior material, thereby improving the volumetric density of the battery pack 1.

By arranging the frame around the battery device 2, the mechanical strength and the reliability of battery terminals comparable to those in case of using the plastics casing may be maintained to assure high operational reliability.

By employing the laminate material of the battery device 2 common as the packaging unit, the designing may be simplified, while the battery device and the battery pack may be produced in an integrated process to diminish processing costs. Additionally, the production time may be shorter to improve the production efficiency.

Moreover, the components needed in the case of employing a plastics casing, such as a box, tape or label, are not needed, thus reducing the number of component parts or material costs.

Figure 9:
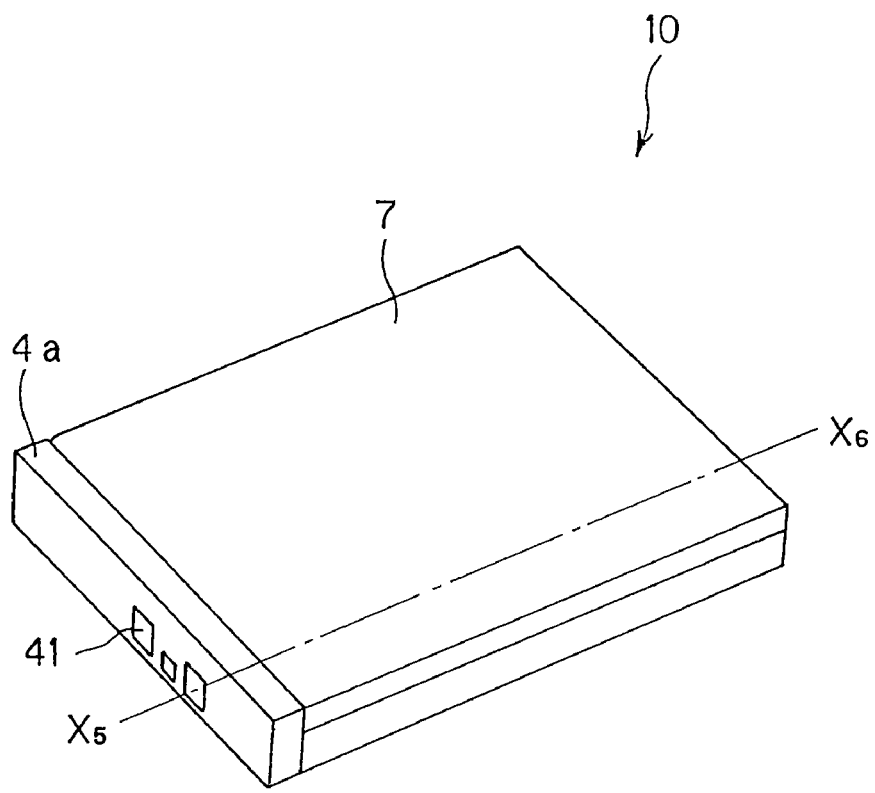
FIG. 9 is a perspective view showing an illustrative structure of a battery pack embodying the present invention.
Figure 10:
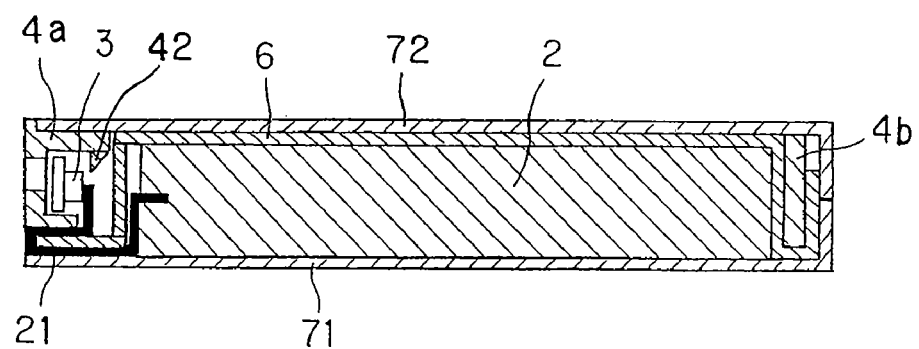
FIG. 10 is a cross-sectional view taken along line $X_5$-$X_6$ of FIG. 9.

FIG. 9 depicts a perspective view showing an illustrative structure of a battery pack 10 embodying the present invention. FIG. 10 depicts a cross-sectional view along line $X_5$-$X_6$ of FIG. 9, and FIGS. 11 to 17 illustrates the manufacturing method for the battery pack 10.

The battery pack 10 includes a battery device 2, a connection substrate 3, a frame 4 and a packaging unit. The battery device 2 is accommodated and hermetically sealed in the packaging unit, and is packaged, along with the connection substrate 3 and the frame 4, by the packaging unit.

Since the battery device, connection substrate and the frame are of a structure similar to the battery device 2, connection substrate 3 and the frame 4 of the above-described first embodiment, respectively, these components are indicated by the same reference numerals, and are not explained here specifically.

The packaging unit, accommodating and packaging the battery device 2, includes a first packaging member 6 and a second packaging member 7.

Figure 11:
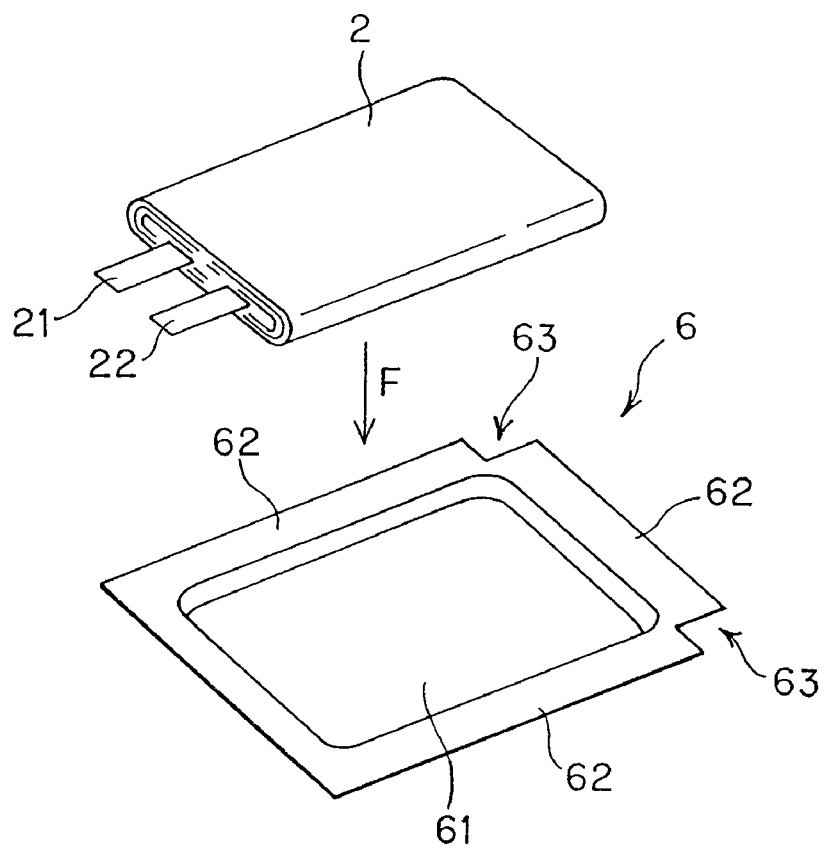
FIG. 11 is a perspective view showing the manner of housing a battery device in a housing recess.
Figure 12:
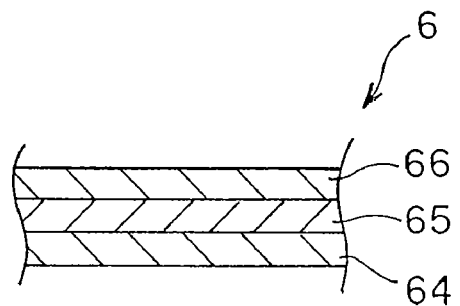
FIG. 12 is a cross-sectional view showing a laminated structure of the packaged unit.

Referring to FIG. 11, the first packaging member 6 is substantially rectangular in shape and is formed with a housing recess 61 in which to accommodate the battery device 2. The rim of the housing recess 61 is a connecting piece 62. In one end along the long side of the first packaging member 6 at each end along the short side thereof is formed a cut-out 63. Referring to FIG. 12, the first packaging member 6 is of a layered structure, comprised of a polypropylene (PP) layer 64, an aluminum layer 65, and a nylon layer 66, sequentially from the inner layer side, with the polypropylene layer 64 operating as a bonding surface.

Figure 13:
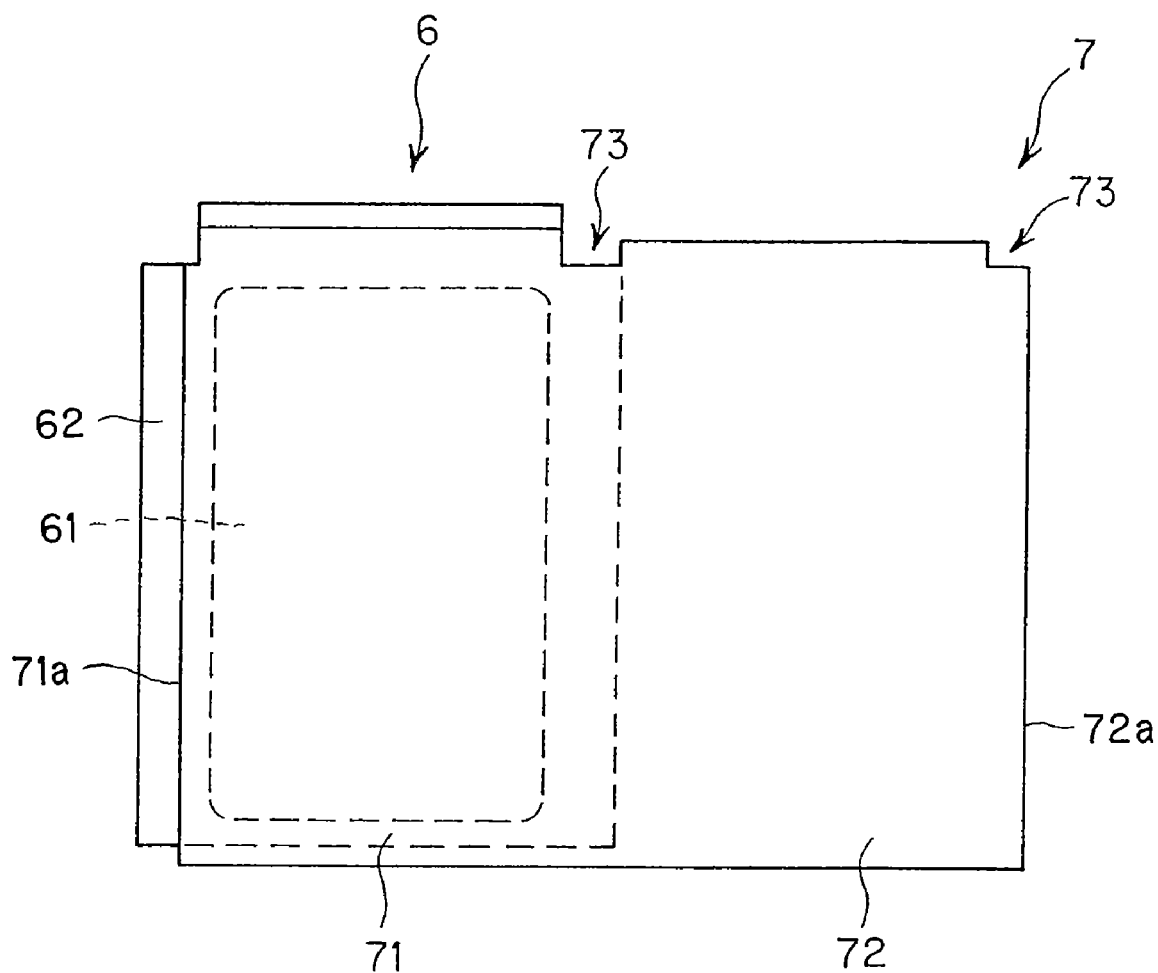
FIG. 13 is a plan view showing the state in which a second packaged unit has been superposed on a first packaged unit.

Referring to FIG. 13, the second packaging member 7 at least includes a substantially rectangular first area 71 and a substantially rectangular second area 72 continuing laterally from the short side of the first area 71. The first area 71 proves an area covering up the first surface, exposed to outside, of the battery device 2, accommodated in the housing recess 61 of the first packaging member 6, while the second area 72 proves an area covering up the second surface of the battery device 2 in cooperation with the first packaging member 6. The second packaging member 7 is also formed with cut-outs 73 in register with the cut-outs 63 formed in the first packaging member 6.

The second packaging member 7 is formed of a material stiffer than the material of the first packaging member 6. Among the examples of the materials of the second packaging member 7 is an aluminum thin sheet on the inner facing side of which is formed a polypropylene layer. By employing a stiff material as the second packaging member 7, which proves an outer packaging unit, the battery pack may be of a sufficient strength and superior in shock-proofness.

There is no limitation to the structure of the first packaging member 6 nor to that of the second packaging member 7, because a large variety of materials and laminated films having laminated structures may be used. The bonding method is also not limited to thermal fusion.

According to an embodiment of the present invention, in which the packaging unit hermetically sealing the battery device 2 is used simultaneously as an exterior material for the battery pack 10, no plastics casing is needed, while the volumetric efficiency may be improved.

First, the battery device 2 is accommodated in the housing recess 61, formed in the first packaging member 6, as indicated by arrow F in FIG. 11. At this time, the battery device 2 is mounted so that the terminal side of the battery device 2 lies opposite to the side of the first packaging member formed with the cut-out 63.

Then, the second packaging member 7 is laid over the first packaging member 6, in the housing recess 61 of which is accommodated the battery device 2, as shown in FIG. 13. The first surface, exposed to outside, of the battery device 2, accommodated in the housing recess 61, is now covered up by the first area 71 of the second packaging member.

The second packaging member 7 is placed with an offset, such that an outer edge of the second packaging member 7 is inwardly offset from an outer edge of the connecting piece 62 of the first packaging member 6, as shown in FIG. 13.

The first packaging member 6 then is bonded to the first area 71 of the second packaging member 7. For this bonding, the polypropylene surfaces of the first packaging member 6 and the first area 71 of the second packaging member 7 are made to face each other around the four sides of the battery device 2, accommodated in the housing recess 61, and thermal fusion is carried out at approximately 170° C.

Figure 15:
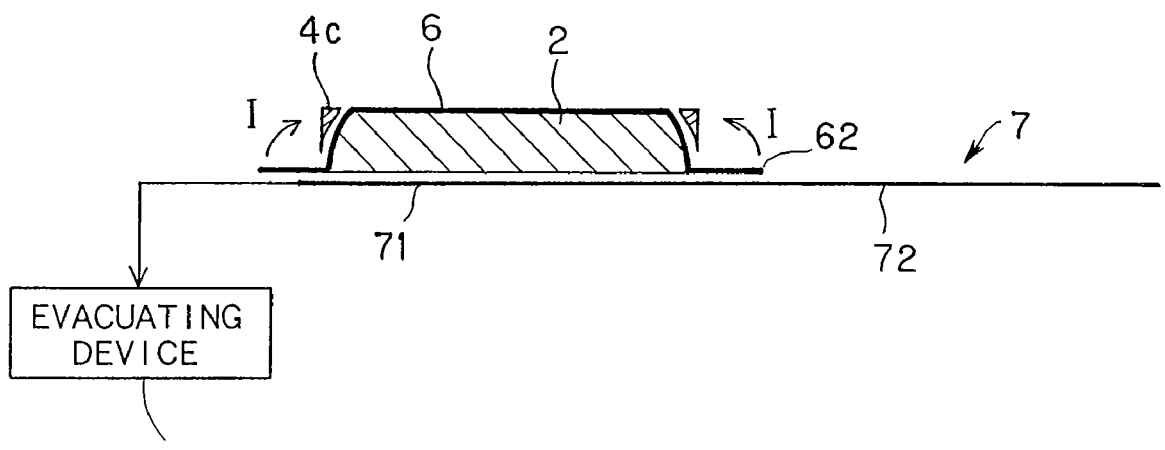
FIG. 15 is a cross-sectional view showing a frame placed around a battery device housed in position.

At this time, evacuation is carried out simultaneously with the bonding, using an evacuating device 80, as shown in FIG. 15. The battery device 2 is now hermetically sealed as it is covered up by the first packaging member 6 and by the first area 71 of the second packaging member 7. The cathode terminal 21 and the anode terminal 22 of the battery device 2 are now held by the bonding surfaces of the first packaging member 6 and by the first area 71 of the second packaging member 7, and taken out in this state to outside the packaging unit 5.

During the evacuation process, the inside of the first packaging member 6 is evacuated, so that, as shown in FIG. 15, the battery device 2 accommodated in the housing recess 61 is subjected to drawing and assumes a substantially trapezoidal cross-sectional shape in which the second surface facing the bottom surface of the first packaging member 6 is smaller in surface area and the first surface on the opening side is larger in surface area.

The cathode terminal 21 and the anode terminal 22 are then bonded to the terminal unit 31 of the connection substrate 3. The frame 4 then is placed, from the side of the first packaging member 6, as indicated by an arrow G in FIG. 14, around the battery device 2, which has been accommodated in the housing recess 61 of the first packaging member 6, then covered up by the first area 71 of the second packaging member 7 of the second packaging member 7 and hermetically sealed. To this frame 4 is fitted the connection substrate 3, to the terminal unit 31 of which have been bonded the cathode terminal 21 and the anode terminal 22.

By fitting the frame 4 around the battery device 2, the mechanical strength and the reliability of battery terminals equivalent to those when a plastics casing is used may be obtained even though the battery device 2 is not accommodated within the plastics casing.

It should be noted that, as a result of the evacuation, the battery device 2 assumes a substantially trapezoidal cross-sectional shape. The lateral wall surface of the frame 4 is placed in a gap formed on the rim towards the second surface of the battery device 2. This enables a dead space to be exploited efficiently to make for a still higher volumetric efficiency.

Figure 14:
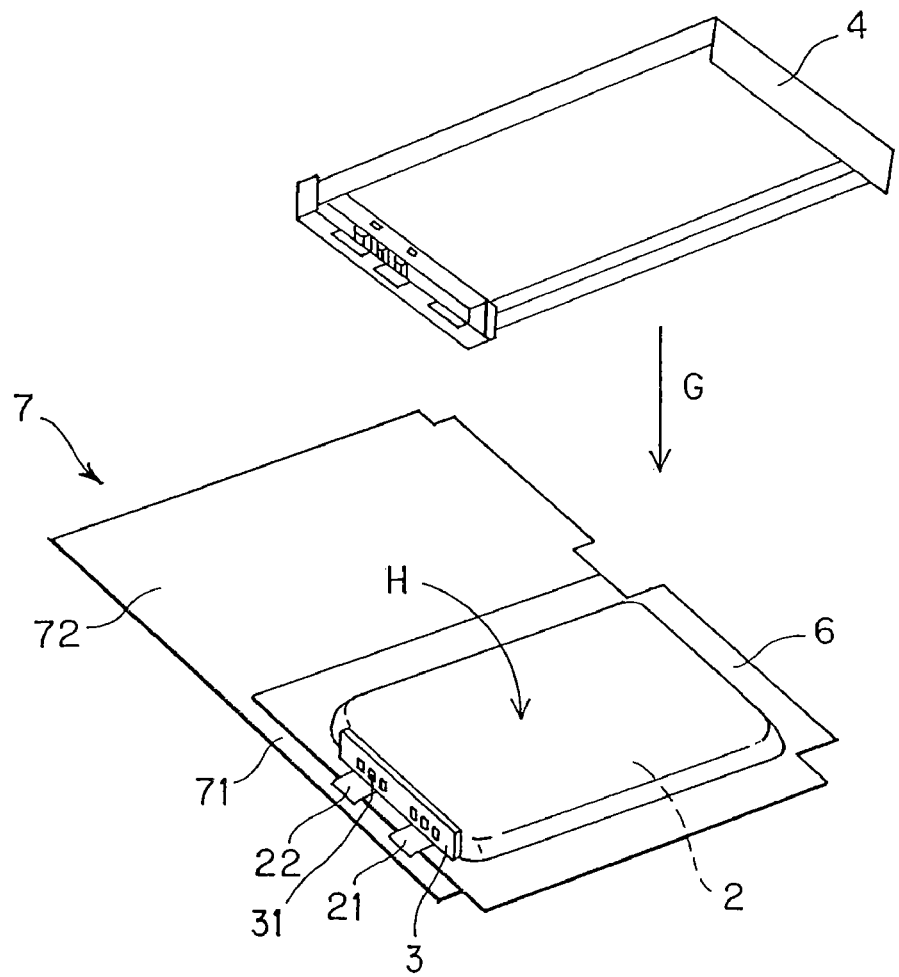
FIG. 14 is a perspective view showing the manner of placing a frame around a battery device housed in position.
Figure 16:
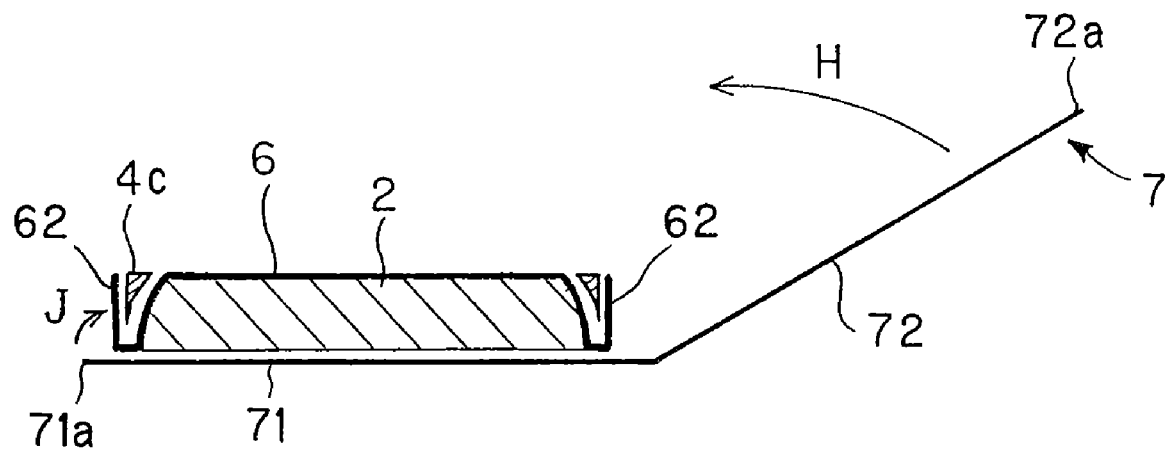
FIG. 16 is a cross-sectional view showing the manner of covering up the battery device with a second packaging unit.

The second area 72 of the second packaging member 7 then is folded back on its first area 71, along a folding line, as indicated by arrow H in FIG. 14 or in FIG. 16. In this manner, the second surface, facing the first surface, of the battery device 2, accommodated in the housing recess 61 of the first packaging member 6, and which has been covered up by the first area 71 of the second packaging member 7, is covered up by the second area 72.

At this time, the bonding piece 62 of the first packaging member 6 is folded back, as indicated by an arrow I in FIG. 15, so as to be mounted along the frame 4 placed around the battery device 2.

The first packaging member 6 and the second packaging member 7 are ultimately made to face each other and bonded together in this position.

It should be noted that the first packaging member 6 and the second packaging member 7 are placed one on the other with a slight offset, as described above. An end 71a of the first area 71 of the second packaging member 7 lies inwardly of the edge of the connecting piece 62 of the first packaging member 6, as shown in FIGS. 13 and 15.

Figure 17:
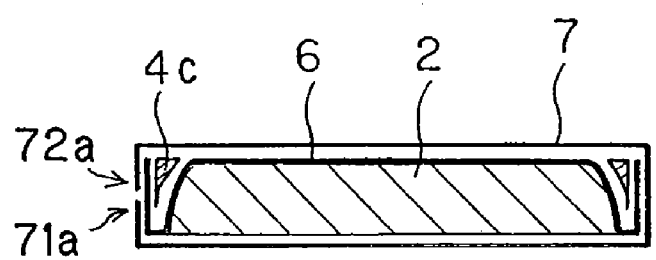
FIG. 17 is a cross-sectional view showing the battery device covered up with the second packaging unit.
Figure 18:
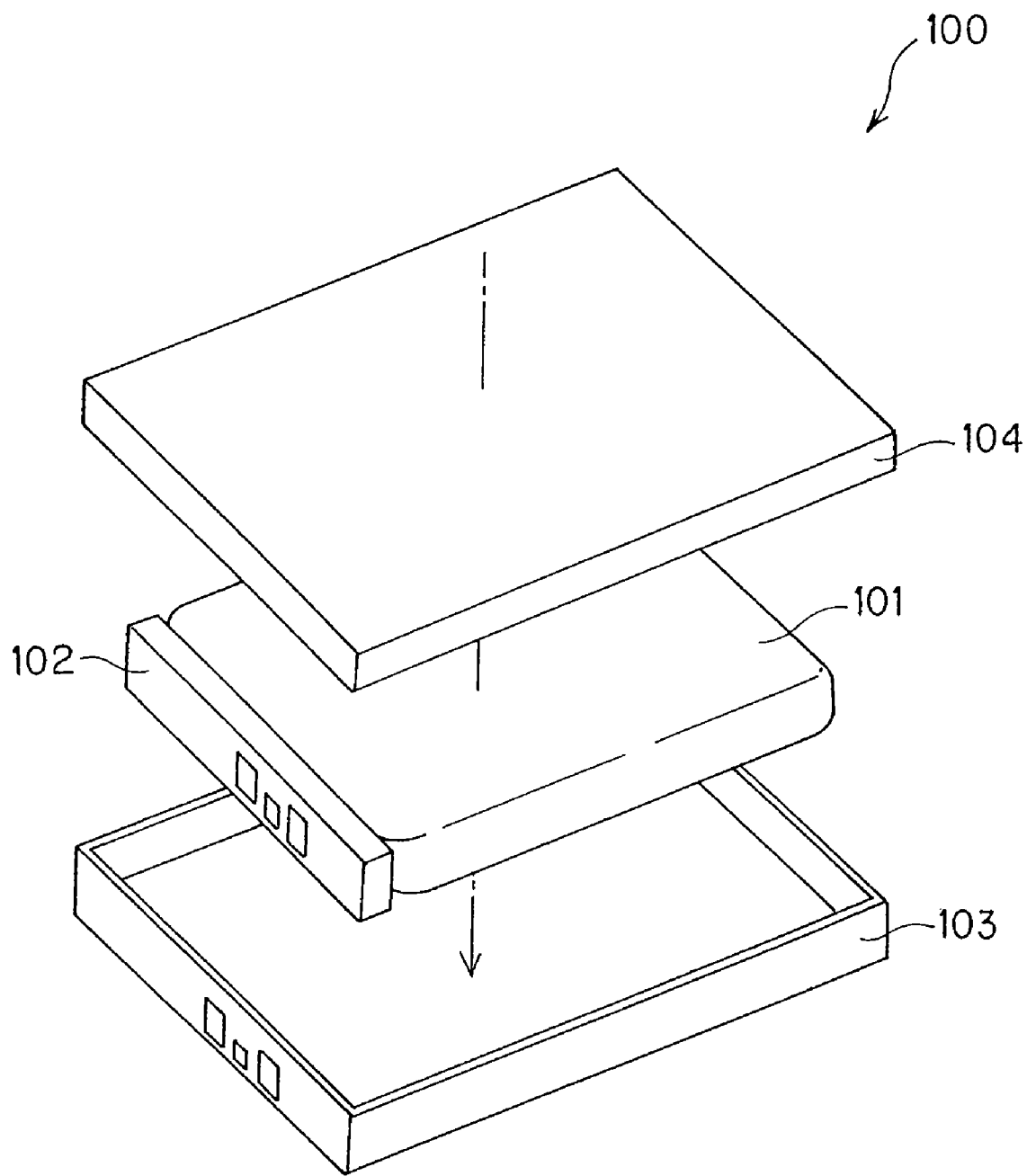
FIG. 18 is an exploded perspective view showing the structure of a conventional battery pack employing a plastics casing.

Thus, the connecting piece 62, placed along the frame 4, is protruded from the first area of the second packaging member 7, placed along the frame 4, as indicated by arrow J, as shown in FIGS. 16 and 17. This protruded surface of the connecting piece 62 is made to face and bonded to the inwardly facing surface of the second area 72 of the second packaging member 7 placed for covering up the first packaging member 6. These surfaces, which are polypropylene layer side surfaces of the first packaging member 6 and the second packaging member 7, are made to face each other and bonded together by thermal fusion at approximately 170° C.

At this time, the second packaging member 7 is bonded to itself, with the end 71a of the first area 71 abutting against the end 72a of the second area 72.

At the rear end of the frame 4, as on the lateral surface side, described above, the protruded surface of the connecting piece 62 and the inwardly facing surface of the second area 72, which has covered up the first packaging member 6, are made to face each other and bonded together.

By so doing, the battery device 2 is accommodated and hermetically sealed in the inside of the packaging unit made up by the first packaging member 6 second packaging member 7. Additionally, the connection substrate 3 and the frame 4 are packaged by the packaging unit to complete the battery pack 10 shown in FIGS. 9 and 10.

With the battery pack 10, produced as described above according to an embodiment, can be improved in volumetric efficiency by not less than 10%, as compared to a case in which a plastics casing is used as an exterior packing, thereby improving the volumetric efficiency of the battery pack 10.

In addition, by placing the frame in position around the battery device, it is possible to maintain mechanical strength and reliability of battery terminals comparable to the case of using the plastics casing, thereby improving the reliability.

By using the laminated material of the battery device common as the packaging pack, it is possible to simplify the designing and to enable integrated manufacture of the battery device and the battery pack to reduce production costs. Moreover, the production time may be reduced to improve the production efficiency.

Furthermore, the components needed in the case of employing a plastics casing, such as a box, tape or label, are not needed, thus reducing the number of component parts or material costs.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising
    a battery device having a cathode, an anode and a polymer electrolyte, with a terminal being taken out from each of the cathode and the anode;
    a first packaging member having a housing recess for accommodating the battery device therein, and a connecting piece around the housing recess;
    a second packaging member having at least a first area for covering up a first surface, exposed to outside, of the battery device accommodated in the housing recess, and a second area for covering up a second surface of the battery device opposite to the first surface;
    a frame mounted around the battery device, accommodated in the housing recess and covered up by and bonded to the first area; and
    a connection substrate mounted on the frame, and including a terminal unit for electrical connection to an external apparatus, the terminal unit being connected to the terminals; wherein
    the battery device is accommodated in the housing recess of the first packaging member, a first surface of the battery device, exposed to outside, is covered up by the first area of the second packaging member, the connecting piece is bonded to the first area;
    the terminals of the battery device, accommodated in the housing recess, and covered up by and bonded to the first area are connected to the connection substrate, the frame is mounted around the battery device, the connection substrate is mounted on the frame;
    the second area of the second packaging member is folded against the first area thereof to cover up a second surface opposite to the first surface of the battery device, accommodated in the housing recess of the first packaging member and covered up by the first area, with the second area; and wherein
    the first packaging member is bonded to the second area of the second packaging member.

2. The battery pack according to claim 1 wherein the battery device is packaged in an evacuated state.

3. The battery pack according to claim 1 wherein the battery device, accommodated in the housing recess, covered up by the second area and evacuated, is hermetically sealed so that, in cross-section, the second surface thereof is a short side and the first surface thereof is a long side; and wherein the frame is mounted on a peripheral rim of the second surface.

4. The battery pack according to claim 1 wherein the frame includes an opening for causing the terminal unit to be exposed to outside therethrough and wherein the connection substrate is held by a retention section of the frame as the terminal unit is exposed to outside through the opening.

5. The battery pack according to claim 1 wherein the second packaging member is formed of a material stiffer than the material of the first packaging member.

6. The battery pack according to claim 1 wherein the first packaging unit includes
    a layer of polypropylene, an aluminum layer and a nylon layer, laminated sequentially from the inner side, and is bonded to itself by thermal fusion of the polypropylene; and wherein the second packaging member is bonded to the first packaging member so that an outer edge of the second packaging member lies inwardly of an outer edge of the connecting piece of the first packaging member and wherein a surface of the second packaging member which faces inwards when the first packaging member is covered up by the second area is caused to face the first surface of the first packaging member and is bonded in this state to the first surface of the first packaging member.

* * * * *